United States Patent [19]

Westcott et al.

[11] 4,329,307
[45] May 11, 1982

[54] METHOD FOR FORMING PLASTIC SHEET

[75] Inventors: Robert F. Westcott, Norwalk; John R. Delamater, Berlin Heights, both of Ohio

[73] Assignee: American Hoechst Corporation, Leominster, Mass.

[21] Appl. No.: 135,848

[22] Filed: Mar. 31, 1980

[51] Int. Cl.³ .............................................. B29C 7/14
[52] U.S. Cl. ................................... 264/160; 264/285; 264/286; 264/296; 425/384; 425/392
[58] Field of Search ............... 264/296, 285, 286, 160, 264/151, 295; 425/384, 392

[56] References Cited

U.S. PATENT DOCUMENTS

| | | | |
|---|---|---|---|
| Re. 28,733 | 3/1976 | Cohen | 264/219 |
| 2,315,804 | 4/1943 | Massoline | 264/285 |
| 2,779,388 | 1/1957 | Quoss | 154/30 |
| 3,024,496 | 3/1962 | Colombo | 264/286 |
| 3,169,274 | 2/1965 | Colombo | 264/286 |
| 3,197,536 | 7/1965 | French | 264/285 |
| 3,237,361 | 3/1966 | Norman | 52/508 |
| 3,281,516 | 10/1966 | Southwick | 264/285 |
| 3,791,185 | 2/1974 | Knudson | 72/181 |
| 3,952,037 | 9/1960 | Ruck et al. | 264/285 |
| 4,096,011 | 6/1970 | Sanders | 156/196 |

Primary Examiner—James H. Derrington
Attorney, Agent, or Firm—Hugh C. Crall

[57] ABSTRACT

This invention relates to a machine for and a method of making building products from a coiled sheet of thermoplastic polymer such as polyvinyl chloride. In the practice of this invention, portions of the polymeric sheet are selectively and sequentially heated and progressively bent to the desired shape by passing the sheet through a series of heating, forming and cooling stations.

The simplified design of the machine enables the user to custom fabricate building products at a construction site with a resulting savings in cost. Typical products adapted to be made in accordance with the invention are exterior building siding, siding accessories and other building products.

5 Claims, 15 Drawing Figures

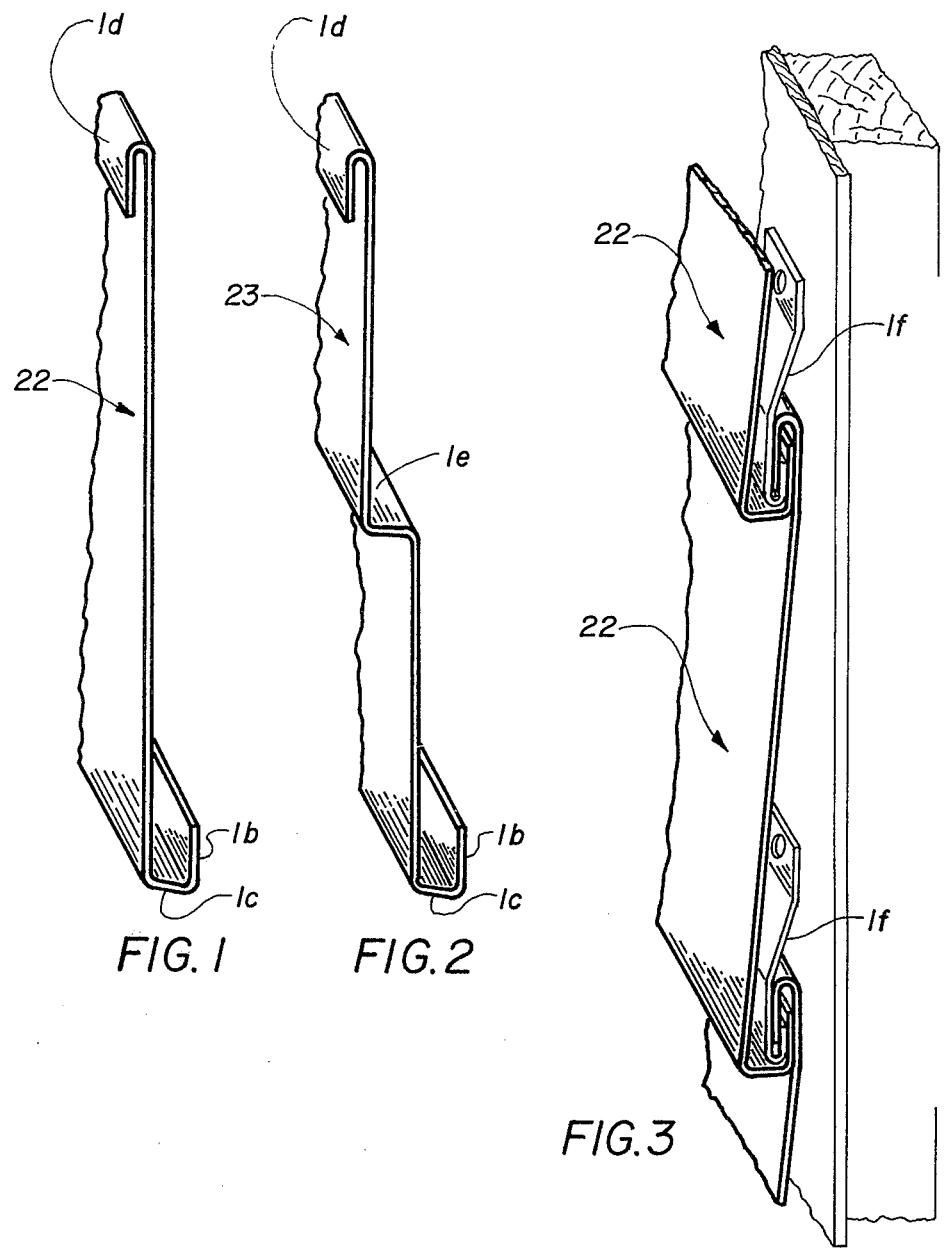

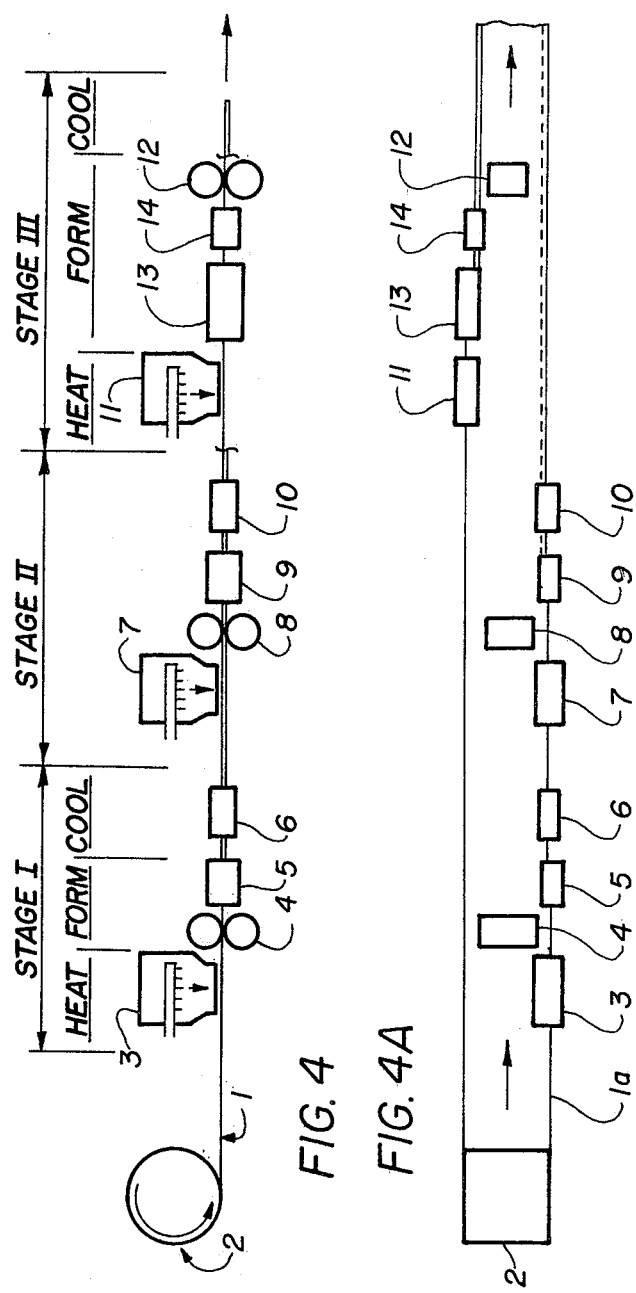

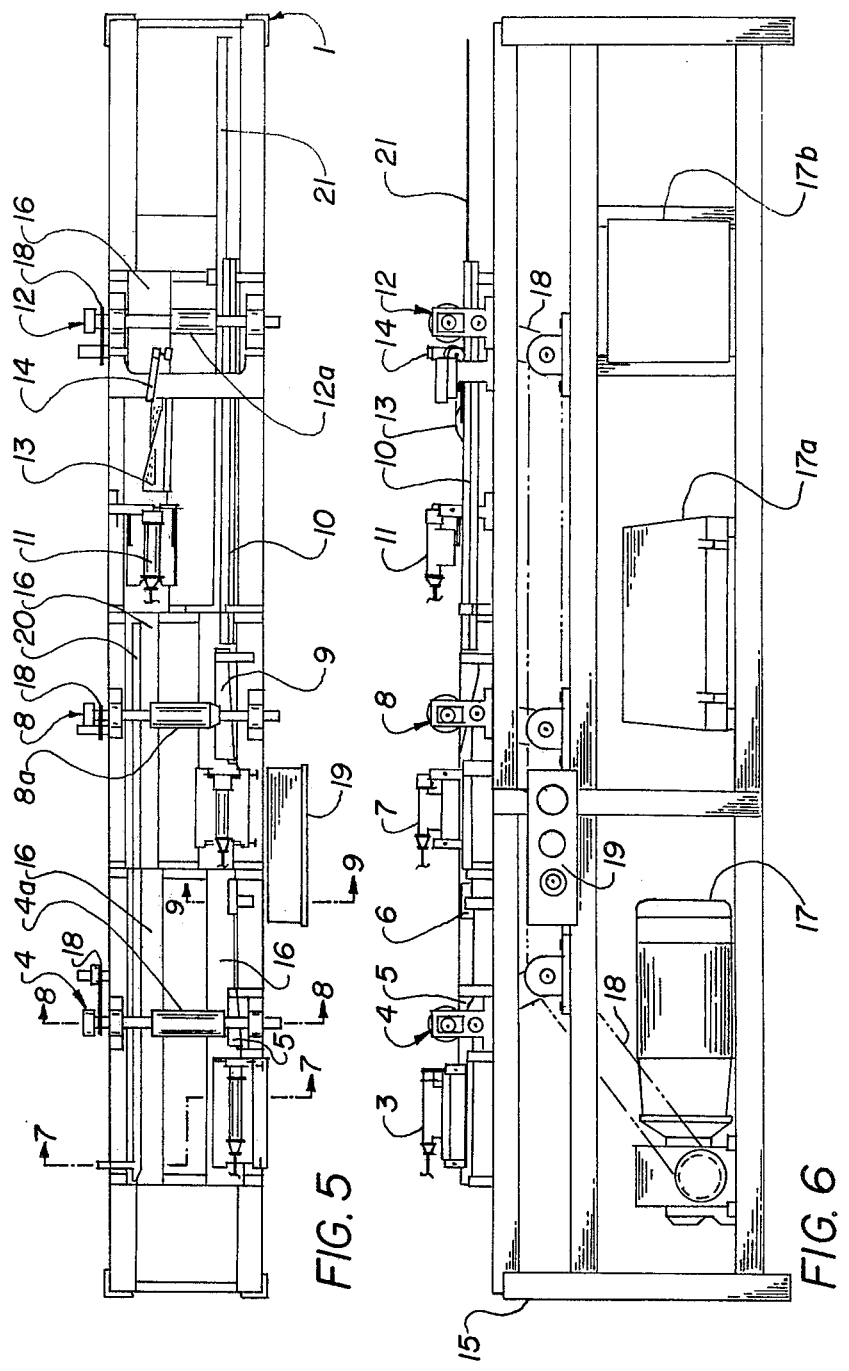

METHOD FOR FORMING PLASTIC SHEET

DESCRIPTION

BACKGROUND OF PRIOR ART

Aluminum can be formed into building products at the job site and in the factory by roll forming a sheet to the desired configuration. U.S. Pat. No.: 3,791,185 (the Knudson patent) describes a method and machine for making exterior building siding by cold forming an aluminum sheet in a series of paired shaping rolls. Each roll stack imparts a desired shape to the sheet and the opposed roll surfaces define the desired configuration.

Various method and machines are also known in the prior art for forming plastic sheet into building products. Exemplary of the prior art are the following U.S. patents:

U.S. Pat. No.: 4,096,111 (the Sander et al patent) discloses molding a sheet of thermoplastic polymer into a generally rectangular plank with a U-shaped portion projecting from one edge of the plank. Intermediate the edge of the plank and the U-shaped portion, an arcuate depression is formed in the structure during the molding operation to provide a hinge connection between the plank depending U-shaped portion. The U-shaped portion is then bent around the arcuate depression into folded relation with the plank to overlie the edge of the plank and provide a joint for interlocking the bottom of the plank with the top of a similarly formed plank in a tongue and groove arrangement. The molding operation is preferably a vacuum forming method. The disclosed process does not appear to be adapted for use at a job-site.

U.S. Pat. No.: 3,237,361 (the Norman patent) discloses a plastic facing for exterior siding. The plastic facing is attached to a rigid board-like core of gypsum, particle board, plywood or other similar building material. The upper and lower edges of the plastic facing are formed with pendent flaps designed to interlock with complementary pendent flaps on adjacent siding members. The upper flap of a siding unit projects downwardly and outwardly from the top front edge of the siding unit and the lower flap projects inwardly and upwardly from the bottom edge of the siding. When adjacent siding units are assembled in vertical overlapping arrangement, the lower flap of the uppermost siding unit is slipped under and behind the upper flap of the lower siding unit to form an interlocked connection between the two units. No method or machine is disclosed in the patent for making this plastic facing product.

U.S. Pat. No.: 3,281,516 (the Southwick patent) discloses a method and apparatus for forming the plastic facing disclosed in the Norman patent. In this disclosure, plastic sheet is passed through an embossing station where longitudinal fold lines are embossed in the sheet parallel to and at predetermined distances from the edges. The sheet is then heated across its entire width and passed through a preformer station where both edges of the sheet are simultaneously bent along the longitudinal fold lines. In the preformer station opposed die surfaces gradually bend the moving sheet along the fold lines to a cross-sectional configuration approaching the desired shape. After exiting the preformer, the sheet enters a heated former station where a pair of opposed heated die surfaces are used to further form the shape of the sheet towards final configuration. After exiting the former station, the sheet passes into an overbend station which is heated at the entrance end and cooled at the exit end. At the overbend station the formed edge portions are bent back against the sheet to impart the final cross-sectional configuration. The formed sheet then passes through a pair of opposed rotating endless belts which pull the sheet from the machine. The formed plastic sheet is then cut to desired length and laminated to a rigid core to form the finished siding product. The process and machine do not appear to be suited for on-site use because of the machine's size and the nature of the final product.

U.S. Pat. No.: 3,169,274 disclosed another method and machine for making exterior siding from plastic sheet. In this disclosure plastic sheet is heat softened and passed into rather complicated corrugated unit comprising a number of fixed female dies termed "shoes". The hot sheet is stretched and forced into contact with the fixed dies by means of spring loaded movable male die members to form the desired cross sectional configuration. The machine appears complicated, expensive to construct and unsuited for on-site use.

Exterior plastic siding is currently commercially produced by the profile extrusion process. In this process, plastic pellets are melted in a heated extruder. The molten plastic is pumped by action of the extruder screw through a die, the outlet of which conforms to the profile of the desired siding unit. The molten plastic profile is cooled in the die or in an in-line former section to below the softening point of the plastic. The extrusion line required for this process is expensive and complicated in construction and operation. The extrusion die is particularly complicated in construction and precision made, since it must be adjustable to control the thickness of the siding profile uniformly across its width and length. Similarly the extruder is a precision made machine designed to operate at high temperatures and pressures. The equipment required for profile extrusion is not suited for on-site production of exterior siding.

It will become readily apparent that the present invention hereinafter described, provides a novel, efficient and simple means to fabricate exterior siding and other building products with many advantages over the prior art.

BRIEF SUMMARY OF THE INVENTION

This invention relates to a method and machine for making building products by continuously forming a sheet of thermoplastic polymer to the desired configuration. In the practice of the invention a sheet of thermoplastic polymer is continuously fed from a roll to a series of heating, forming and cooling stations. At each station a portion of sheet is selectively heated and that heated portion is bent in a fixed die member to produce a desired cross-sectional configuration in the sheet. Sequential heating, forming and cooling operations are performed on the sheet until the final cross-section is achieved. The formed sheet is then cut to length. Intermediate the last forming station any number of mechanical finishing operations can be performed on the product, e.g., drain or fastener holes can be continuously cut in product by means of a rotary punch, polishing and painting operations, the application of a thin film laminate or an insulation barrier.

The method and machine of this invention is particularly suited for the on-site manufacture (i.e. manufacture at the construction site) of exterior siding products of custom lengths adapted to fit the dimensions of a particular structure. This feature, although simple in concept, provides economic advantages to the builder by reducing waste incurred in cutting standard-length siding to fit the structure and increased productivity by eliminating time consuming hand fitting and cutting of standard lengths. The invention is also, of course, suited for use off-site at a production facility.

The forming of the unfinished sheet into the desired product by the sequential and selective heating and forming method of the invention permits one to construct a simple machine of reduced cost and size that is adapted to be easily moved from job-site to job-site. In the prior art, siding products were produced by heating the entire sheet to the softening point or by melt extrusion of the polymer to the desired configuration. This practice results in the need to provide complicated and precision-machined forming dies adapted to form and support the sheet across its entire width and complicated transport means for moving the sheet through the operation. Another consequence of this prior art practice is increased energy costs both from the heating standpoint and also from the need to provide cooling means for the sheet across its entire width after forming is effected. The method and machine of this invention avoids these problems and costs.

Although this invention is hereinafter described in terms of the manufacture of exterior siding, it will be readily apparent to one skilled in the art that this invention can be adapted to produce other products from thermoplastic sheet, e.g., siding accessories such as "J" channel, corner post, soffit, and other miscellaneous products, such as rain gutters and downspouts.

BRIEF DESCRIPTION OF DRAWINGS

FIG. 1 shows a side view of a piece of exterior siding made pursuant to this invention.

FIG. 2 shows a side view of another form of an exterior siding unit that can be manufactured by the method and machine of the invention.

FIG. 3 shows two siding units in assembled, interlocked relationship and secured to a wall by fasteners adapted to anchor the siding in place.

FIG. 4 is a simplified schematic of the process and machine for forming siding units in accordance with the invention.

FIG. 4A is a schematic top view of the process and machine of this invention.

FIG. 5 is a simplified top view of the machine of the invention.

FIG. 6 is a simplified side elevation view of the machine of FIG. 5.

DETAILED DESCRIPTION OF INVENTION

The siding products of the invention are formed from plastic sheet that can be softened by the application of heat. Examples of suitable plastics having this heat-softening characteristic are polyvinyl chloride and its copolymers, the impact resistant, rubber modified polystyrenes such as impact styrene and ABS nylon and polyesters. Thermosetting plastics that can be heated to their softening point and bent are suited for use in this invention. Polyvinyl chloride is particularly preferred because of its forming characteristics, strength and outdoor weathering properties. If required, U.V. stabilizers, antioxidants and fillers can be incorporated in the plastic to improve its stability to heat, light and oxidation and its strength.

Calendered polyvinyl chloride sheet also possesses a desirable property for exterior siding; the calendered sheet is convex in cross-sectional configuration. If a siding unit is formed and the convexity or camber is retained in the sheet, this inward bowing or camber of the sheet resists "oil canning" or outward bulging of the siding units in the direction perpendicular and away from the building wall. Unlike the processes of the prior art, only the edge portions of the sheet need be heated in the process of the invention and therefore the desired camber in the sheet is not destroyed in the heat-forming operation. The sheet used in this invention may be embossed with a grained texture to simulate a wood finish and has a thickness in the order of 0.045 of an inch.

In the following description the terms "right-hand edge" and "left-hand edge" refer to the respective right and left side of the machine or sheet facing the machine and looking forward towards the direction of sheet movement. Similarly, the "entry" and "exit" refers to points on the machine in reference to the direction of sheet movement. The term "softening point" as used in the description is intended to define that temperature at which bending of the sheet will occur without buckling or cracking the sheet and below which the sheet can be processed without distorting the desired configuration that has been imparted in the sheet.

Figure 10:
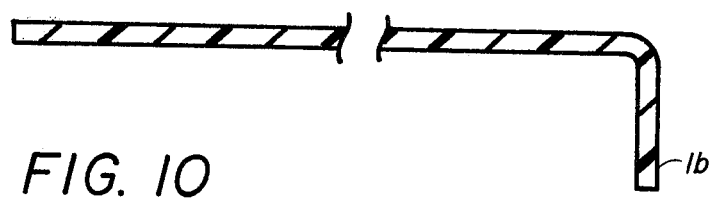
FIG. 10 is a cross-sectional view of the partially formed sheet after it exits the first stage forming station.

FIG. 4 and FIG. 4A are simplified schematics showing the process and machine of this invention for forming siding in side and plane views respectively. Sheet 1 is continuously fed from a roll 2 to the first stage heating station having a first stage heater 3 which heats and softens the right-hand edge portion 1a of the sheet. The sheet is advanced to the first stage forming station by pull rolls and forced into engagement with the first stage transition guide 5. The softened edge portion of the sheet is rolled downwardly in the first stage forming station to form a generally vertical, downwardly depending first member 1b which is shown in FIG. 10. After exiting the first stage transition guide 5, the sheet moves in sliding engagement with the first stage cooling bar 6 of the first stage cooling station where the temperature of the edge portion of the sheet is reduced to below its softening point. The sheet passes to the second stage heating station and under the second stage heater 7 where a portion of the sheet positioned inwardly of its right-hand edge is heated to the softening point. The sheet then advances, assisted by the action of the second stage pull rolls 8a to the second stage forming station and into the second stage transition guide 9. Sliding engagement is made between the outer right-hand edge of the sheet and the interior surface of the second stage transition guide 9 and the edge portion of the advancing sheet is turned downwardly, pivoting or bending about the heated portion of the sheet, to form a downwardly and generally vertical depending second member 1c shown in FIG. 11. This second turning of the edge portion of the sheet causes the depending first member 1a to be rotated approximately 90° so that it is now generally parallel to the upper surface of the sheet. After exiting the second stage transition guide, the sheet is advanced to the second stage cooling bar 10 of the second stage cooling station and the temperature of the heated portion of the sheet is reduced below its softening point by the contacting of the sheet along the cooled surfaces of the second stage cooling bar 10.

Figure 12:
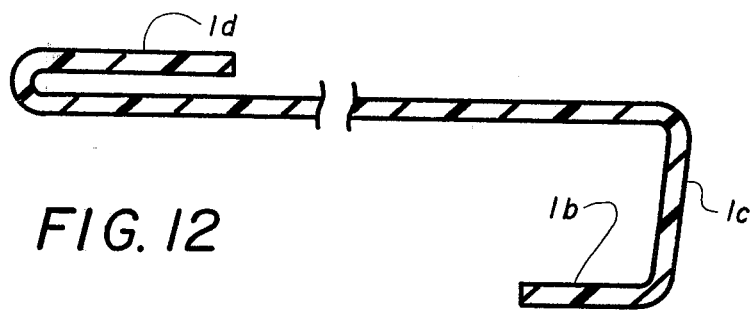
FIG. 12 is an end view of the formed sheet after its exits the third stage forming station.

The sheet advances to the third stage heating station having a third stage heater 11 positioned above the left-hand edge portion of the advancing sheet. A predetermined portion of the sheet is selectively heated as it passes under the third stage heater 11, and the sheet is moved, assisted by the action of the third stage pull rolls 12a, to the third stage forming station and into engagement with the third stage transition guide 13. The passage of the sheet through the third stage transition guide causes the softened edge of the sheet to roll upwardly and inwardly to form a generally U-shaped member. The sheet advances from the third stage transition guide and is passed underneath a cam roller bearing assembly 14 shown in FIG. 5. The downward force exerted by the cam roller bearing assembly bends the heated left-hand edge of the sheet to complete the bending of the edge portion to form the U-shaped member 1d as shown in FIG. 12. The finished siding 22 is shown in FIG. 1.

Having generally described the process and machine of this invention, a more detailed description will follow of the machine of this invention and its operation by reference to FIGS. 5–14.

FIG. 5 is a top plan view of the machine and FIG. 6 is a side elevation view of the same. Referring specifically to FIG. 5 and FIG. 6 the machine comprises a base 15 and a machine table 16. The surface of the machine table is not continuous over the entire length and width of the machine in order to reduce the weight of the unit and to permit pull roll engagement with the sheet. Mounted on the base is a direct current electric motor drive means 17 and motor controls 17a and 17b. The drive means 17 is connected by chain and sprocket linking means 18 (shown in phantom lines) to pull roll assemblies 4, 8 and 12. The construction of pull roll assemblies will not be discussed since they are standard, and the bottom pull roll of each assembly is omitted for simplification of the drawings. The drive means 17 is connected to the pull roll assemblies by interconnected linking means 18 to assure synchronization of the speed of the pull rolls 4a, 8a and 12a.

A first stage heater 3 is mounted from the machine table 16 and positioned above the upper surface of the table to effect heating and softening of the right-hand edge of the sheet when it is passed beneath the heater 3. All heaters shown, 3, 7 and 11 are gas-fired and heat-resistant diffusers (not shown) are positioned between the heaters and the upper surface of the machine table to effect uniform heating of the sheet. The temperature in the heating station can be controlled by means of a conventional valve. Polyvinyl chloride may be formed in this process at a temperature between 140°–150° C. Heater control valves, motor speed controls and cooling water controls are mounted in the machine control panel 19. If desired, the gas-fired heaters may be replaced by electrical heating units.

Figure 13:
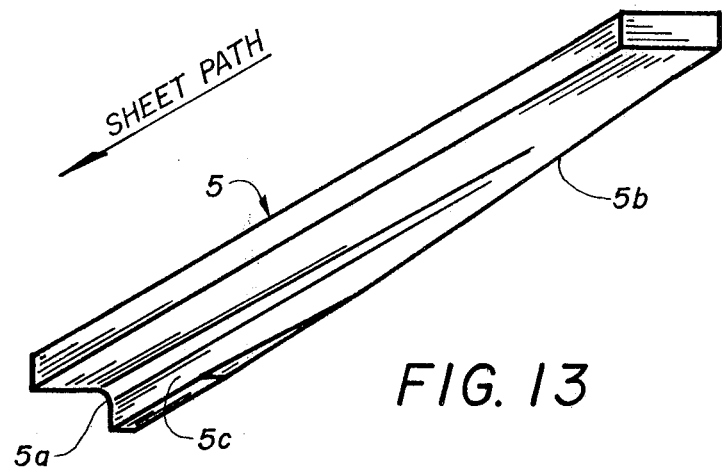
FIG. 13 is a perspective view of the first stage transition guide.
Figure 14:
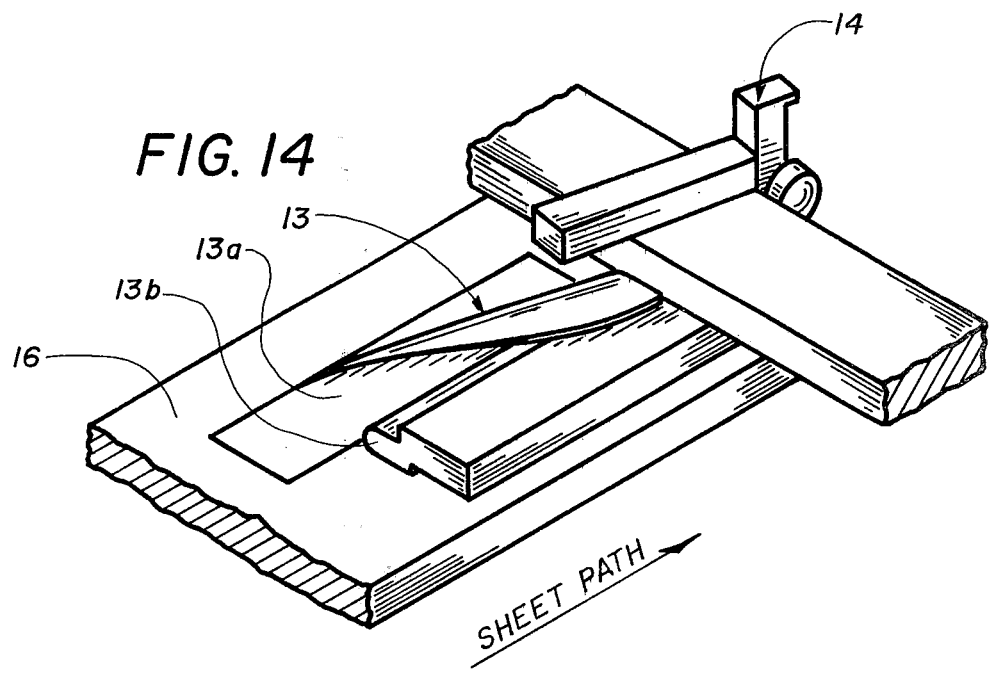
FIG. 14 is a perspective view of the third stage transition guide and cam follower bearing assembly.

Pull roll 4a and its opposing bottom pull roll (not shown) moves the sheet to the first stage forming station and forces the softened edge of the sheet into engagement with the interior surface of the first stage transition guide 5. The first stage transition guide at the entry point is generally flat with its lower surface positioned above and parallel to the upper surface of the sheet. The cross-section of the first stage transition guide gradually changes to an inverted and reversed "L" shaped configuration at its exit end. Shown in FIG. 13 is a perspective view of the first stage transition guide 5. The exterior wall of the downwardly depending portion 5a (FIG. 13) of the first stage transition guide is displaced inwardly relative to the entry right-hand edge surface 5b of the guide by a distance equal to the vertical height of the interior wall surface 5c of the guide. As the softened edge portion of the sheet passes through the first transition guide and engages the interior surface of the first stage transition guide, it is gradually bent approximately 90° to its original position. The right-hand edge of the machine table 16 functions as an interior guide to prevent overbending of the sheet. The left-hand edge of the sheet is maintained in position by a sheet guide 20 mounted on the machine table 16. The position of sheet guide 20 is adjustable to compensate for sheet width variation.

Figure 7:
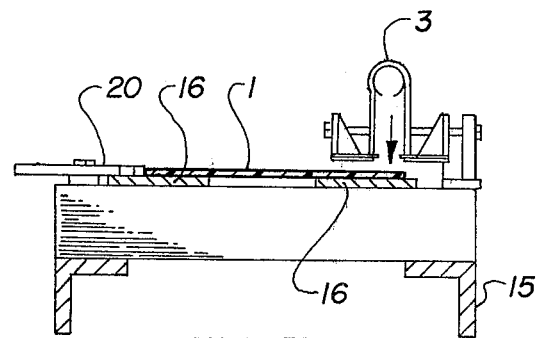
FIG. 7 is a sectional view of the first stage heating station taken along the plane 7—7.
Figure 8:
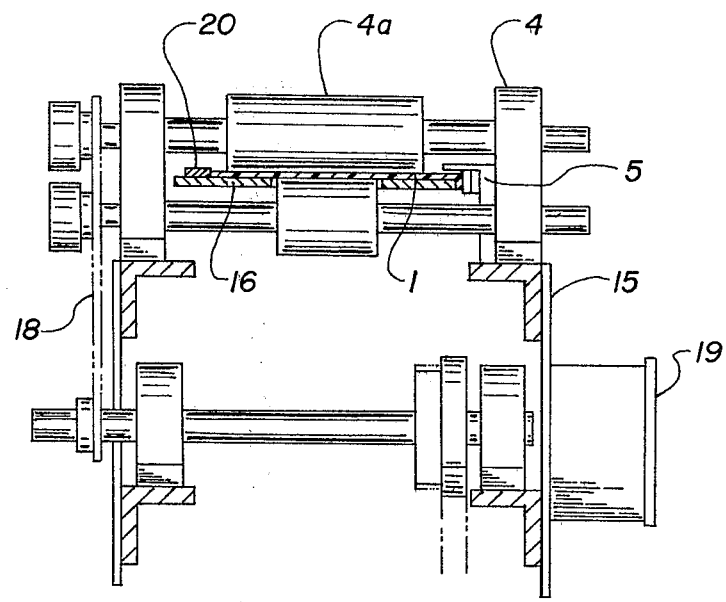
FIG. 8 is a sectional view of the first stage forming station taken along the plane 8—8.

FIG. 7 and FIG. 8 show sectional views of the first stage heating station along the plane 7—7 and of the first stage forming station along the plane 8—8 respectively.

Figure 9:
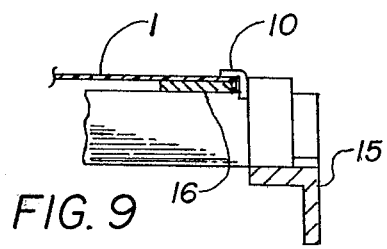
FIG. 9 is a partial sectional view of the first stage cooling bar taken along the plane 9—9.

FIG. 9 is sectional view of the first stage cooling bar 6, which is cooled by water circulated through the interior of the cooling bar. The interior upper and interior side surfaces of the first stage cooling bar 6 provide a guide for the depending first member 1b of the sheet.

FIG. 10 is a cross sectional view of the sheet after it exits the first stage forming station.

After the sheet exits the end of the first stage cooling bar 6, it is passed along the machine table and under the second stage heater 7. The second stage heater 7 is positioned relative to the upper surface and upper right edge of the sheet to heat-soften the sheet along a plane generally in alignment with a line projected from the inner surface edge of the second stage transition guide 9 at its exit end. The sheet advances to the second stage transition guide 9 assisted by the second stage pull rolls 8a. As the sheet passes through the second stage transition guide, the heat-softened portion of the sheet engages the interior surface of the guide. The right-hand edge of the machine table 16 functions as an interior guide to prevent over-bending of the sheet. The bend accomplished in the second stage transition guide is approximately 90° from the upper surface of the sheet. The sheet slidably engages the surface of the second stage cooling bar 10 and the heated portion is cooled to set the second bend in the sheet. The second stage cooling bar is water cooled.

Figure 11:
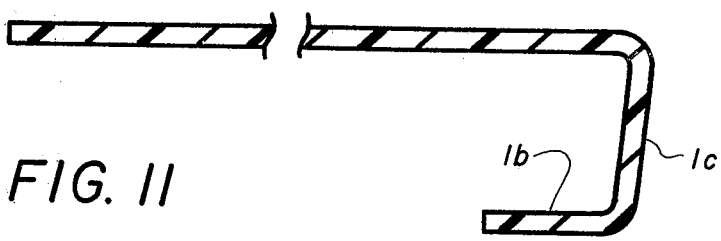
FIG. 11 is a cross-sectional view of the partially formed sheet after it exits the second stage forming station.

FIG. 11 shows a cross sectional view of the sheet as it exits the second stage forming station. A generally vertical second member 1c depending from the right-hand edge has been formed in the sheet at this point in the process.

The sheet advances to the third stage heater and the left-hand portion is heat-softened to forming temperature. Pull rolls 12a pull the sheet through the third stage transition guide 13. The left-hand edge heat-softened portion of the sheet engages the interior surface 13a of the third stage transition guide and the left-hand edge portion of the sheet is bent upwardly and inwardly over the surface of the sheet to form a generally U-shaped third member. FIG. 12 shows the cross sectional configuration of the sheet at this point in the process. Third stage transition inner guide 13b shown in FIG. 14 slidably engages the sheet and prevents the sheet from shifting sidewise relative to machine table and from overbending as it passes through the third stage transition guide. The sheet passes under the cam follower bearing assembly 14 shown in FIG. 5 and the cam follower bearing assembly engages the upper edge portion to further close the U-shaped third member formed in the third stage transition guide. The vertical height of the cam follower bearing is adjustable to control the closing force imposed upon the sheet. The sheet is then advanced and allowed to cool by air convection to a temperature below its softening point. Machine guide 21 maintains the sheet properly indexed relative to the machine table as the sheet is advanced from the second stage cooling station to the exit end of the machine.

The formed siding member is advanced to a rotary punch (not shown) and drain holes are cut in the depending second member 1c.

Nail holes may be cut in the left-hand edge of the sheet 1d, at the top of the siding unit, if one desires to fasten the siding to the building by nails. However, it is believed that a better construction method involves the use of fastener clips which do not require nail holes through the siding unit. A more complete description of this method of fastening follows below.

The sheet then advances to a cutting mechanism (not shown) which is adjustable to cut the moving sheet to a desired length.

FIG. 1 shows a side view of a siding member 22 made in accordance to the heretofore described process. In the preceding description the left-hand edge sheet portion corresponds to the upper edge of the siding member and right-hand edge portion corresponds to the bottom edge of the siding member.

If desired, a fourth heating, forming and cooling station can be installed after the third stage pull rolls to produce the siding member 23 shown in FIG. 2. The modified siding unit 23 shown of FIG. 2 is produced with a corrugation 1e in the center of the siding unit to simulate the appearance effect obtained with a narrow width siding unit.

FIG. 3 shows two siding units in assembled relationship and secured to a wall by fasteners 1f adapted to anchor the siding to the building structure. As can be seen, it is readily apparent from an inspection of FIGS. 1, 2 and 3, that the outwardly projecting U-shaped member 1c formed in the left-hand edge of the sheet on the machine table is the upper edge siding member. The lower edge of the siding is the right edge of the sheet as described in the preceding forming operation. In assembled relation, the outwardly projecting upper U-shaped edge of the lower siding unit is interlocked into the inwardly projecting bottom edge of the upper siding unit. The siding is anchored to the building at its upper edge by means of hook-shaped clips 1f shown in FIG. 3. The clip 1f at its bottom has an inwardly facing hook that interlocks with the outwardly facing U-shaped projection at the top of the siding member. At the top end of the fastener is a nail hole through which the clip is anchored to the wall by conventional nailing. Attaching the siding members with this type of fastener eliminates the need to nail through the siding and also provides for a means for the siding to expand or contract without binding or buckling that can occur with variation in ambient air temperatures.

The transition guides of the invention and their position may be modified to produce products of different configuration such as siding accessories, rain gutters and downspouts.

In the preceding description, the third stage forming station comprises a transition guide and a cam follower bearing assembly. The cam follower bearing assembly can be replaced by any suitable roller assembly, i.e. a rotatable member or bearing adapted to slidably engage the sheet and exert a force against the sheet to form it to a desired cross sectional configuration. Similarly the sheet forming stations may comprise both a trasition guide and a roller assembly.

The transition guides used in this invention may be designed to effect a rotation of the heated edge portions of this sheet through a plane transverse to the machine table or unheated surface of the sheet intermediate or past the vertical axis of said transverse plane.

The water cooled bars of the cooling stations of this invention may be replaced by air cooling devices and guides to maintain the sheet properly indexed relative to the machine table. Similarly the sheet may be allowed to simply travel along the machine table a sufficient distance to permit the temperature of the sheet to drop below the softened point of the plastic. Such modifications will be readily apparent to one skilled in the art. Also it will be appreciated that whereas only one embodiment of the invention has been illustrated and described, various changes may be made without departing from the spirit of the invention of the scope of the appended claims.

I claim:

1. A method for continuously forming plastic sheet to a desired cross-section comprising: feeding a plastic sheet to a first heating station and selectively heating and softening a first edge portion of said sheet; advancing said sheet to a first forming station having a first transition guide wherein said heated first edge portion is brought into contact with the first transition guide; advancing said sheet through said first transition guide wherein said heated first edge portion is rotated through a plane transverse to the surface of the unheated portion of the sheet to impart a desired configuration in said first edge portion; advancing said sheet to a first cooling station wherein said heated first portion is cooled below the softening point of said sheet; advancing said sheet to a second heating station and selectively heating and softening a second edge portion of said sheet located on the opposite side of said sheet from said first edge portion; advancing said sheet to a second forming station having a second transition guide wherein said heated second edge portion is brought into contact with a second transition guide; advancing said sheet through said second transition guide wherein said heated second edge portion is rotated through a plane transverse to the surface of the unheated portion of the sheet to impart a second desired configuration in said second edge portion; advancing said sheet to a second cooling station wherein said heated second edge portion is cooled below the softening point of said sheet; and cutting said sheet to a desired length.

2. A method according to claim 1 wherein at least one of said forming stations comprises a transition guide and a roller assembly.

3. A method for continuously forming plastic sheet into exterior siding units comprising: feeding a plastic sheet to a first heating station and selectively heating and softening a first edge portion of said sheet; advancing said sheet to a first forming station having a first transition guide wherein said heated first edge portion is brought into contact with a first transition guide; advancing said sheet through said first transition guide wherein said heated first edge portion is rotated downwardly to form a generally vertically depending first member; advancing said sheet to a first cooling station wherein said heated first edge portion is cooled below the softening point of said sheet; advancing said sheet to a second heating station and selectively heating and softening a second edge portion of said sheet located inwardly of said depending first member; advancing said sheet to a second forming station having a second transition guide wherein said heated second edge portion is brought into contact with a second transition guide; advancing said sheet through said second transition guide wherein said second heated edge portion is rotated downwardly in a direction generally perpendicular to the surface of the unheated portion of said sheet to form a generally vertical, depending second member; advancing said sheet to a second cooling station wherein said heated second edge portion is cooled below the softening point of said plastic sheet; advancing said sheet to a third heating station located on the opposite side of the sheet relative to said first edge portion and selectively heating and softening a third edge portion of said sheet; advancing said sheet to a third forming station having a third transition guide wherein said heated third edge portion is brought into contact with a third transition guide; advancing said sheet through said third transition guide wherein said heated third edge portion is rotated in a direction generally upwardly and inwardly over the surface of the unheated sheet portion to form a depending U-shaped third member; advancing said sheet to a third cooling station wherein said heated third edge portion is cooled below the softening point of said sheet; and cutting said sheet to a desired length.

4. The method according to claim 3 comprising advancing said sheet from said third cooling station to a fourth heating station wherein a predetermined portion of the center of said sheet is heated to the softening point; advancing said sheet to a fourth forming station having a fourth transition guide wherein said heated sheet portion is forced into engagement with the interior surfaces of said fourth transition guide and whereby a corrugation of said heated portion is effected.

5. A method according to claim 3 or 4 wherein at least one of said forming stations comprises a transition guide and a roller assembly.

* * * * *